Jan. 22, 1935.  H. R. McMAHON  1,988,696
BUMPER END CONSTRUCTION
Filed Oct. 31, 1930
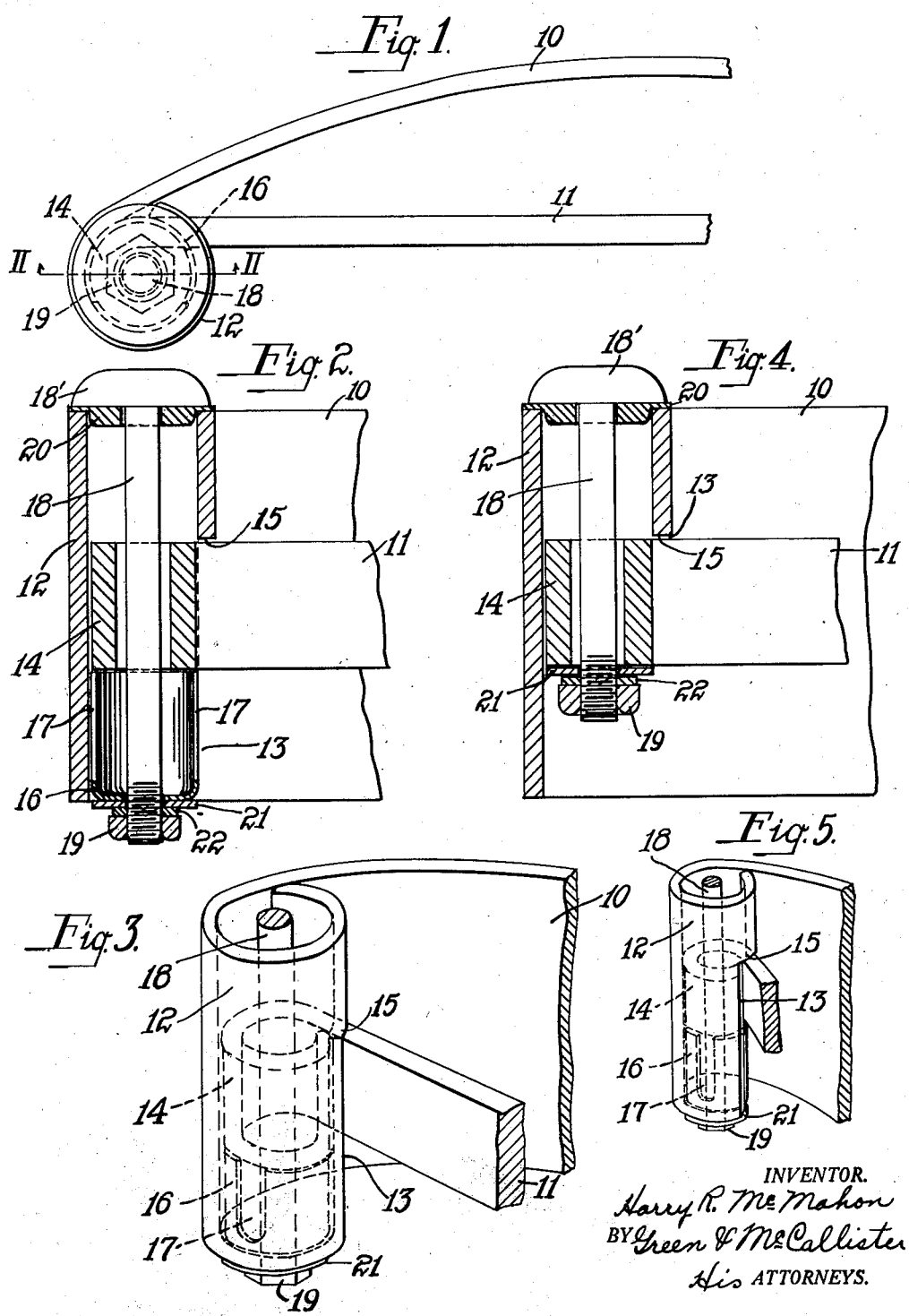

Patented Jan. 22, 1935

1,988,696

UNITED STATES PATENT OFFICE 1,988,696

BUMPER END CONSTRUCTION

Harry R. McMahon, Coraopolis, Pa., assignor to Standard Steel Spring Company, a corporation of Pennsylvania Application October 31, 1930, Serial No. 492,511

7 Claims. (Cl. 293—55)

This invention relates to bumpers for vehicles and particularly to the connections between the ends of the bumper bars.

Prior known bumper constructions have many inherent and latent defects which are known to those skilled in this field and which need not be recapitulated here. The continual search and experimentation for a successful and economical bumper is plain evidence of the unsatisfactory conditions existing with known bumpers.

One of the objects of my invention is to provide a sturdy and simple bumper construction having a minimum number of parts and subjected to a minimum of wear, while at the same time presenting a substantially enclosed construction having no appreciable tendency to collect liquid or solid particles to deteriorate or decrease the efficiency of the bumper.

Another object is so to connect the ends of the bumper bars that an unusually effective and efficient bumper is obtained, as well as one which is of highly desirable appearance and simply and economically constructed and assembled.

Other and further objects will either be apparent to those skilled in the art or will be understood hereinafter.

In the accompanying drawing:

Figure 1 shows in plan view fragmentary parts of a bumper construction connected at the end in accordance with one embodiment of my invention.

Fig. 2 is a cross-section on the line II—II of Fig. 1.

Fig. 3 is a perspective of the parts shown in Figs. 1 and 2, but with certain elements omitted.

Fig. 4 is a view similar to Fig. 2 of a modified form of the invention; and

Fig. 5 is a view similar to Fig. 3 but at a different angle to show certain phases of the invention more clearly.

The numeral 10 represents the front or impact bar of the bumper which is of any suitable material and which is relatively wide as shown and which may have any suitable or desirable cross-sectional area dependent upon the strength and rigidity or the like required under any given circumstances. Numeral 11 indicates the rear bar of the bumper and the bar is suitably attached by means, not shown, to the frame or to any appropriate part of the vehicle to which the bumper is to be attached. This rear bar 11 is relatively narrow, as shown, being about substantially one-third the width of the front or impact bar 10, said rear bar being made of any suitable material having the requisite properties and characteristics and having a cross-sectional area of such size as the engineer may design for the requirements to be met. In a general sense, I form the rear bar 11 of a greater thickness than that of the wider impact bar 10, so that the section modulus, that is the product of the width and the thickness of the bars, is substantially equal.

As is well shown in Fig. 3, the impact bar 10 has its end bent to form a cylindrical portion 12, extending the full width of the bar, but having a cut-away portion 13 extending about two-thirds the width of the bar at the inner lowermost edge thereof, thereby forming a slot or opening in which rear bar 11 is guided and limited in its movements and by means of which rear bar 11 may be assembled in operative association with bar 10 as will be more fully explained hereinafter. This cylindrical portion may be formed in any suitable way not forming a part of the present invention.

Rear bar 11, as likewise most clearly shown in Fig. 3, also has its end portion bent to form a cylindrical portion 14, this cylindrical portion having an external maximum diameter substantially equal to or slightly less than the minimum internal diameter of the cylindrical portion 12 of bar 10.

Assuming then that bars 10 and 11 with their respective cylindrical portions 12 and 14 formed as shown are disassembled, they may be assembled by inserting the cylindrical portion 14 of bar 11 upwardly into cylindrical portion 12 of bar 10 from the bottom thereof and axially with respect thereto. The adjacent portion of bar 11 slides upwardly in cut-out portion 13 until the upper edge of bar 11 abuts the shoulder 15 formed by the cut-out portion 13, said shoulder resulting from the fact that the upper one-third portion of the inner end of the cylindrical portion 12 is not cut-away; this upper one-third portion forming at the same time a unitary spacer member which maintains bar 11 substantially centrally of bar 10 without the use of any removable or detachable spacer member as conventionally used in prior known constructions.

After the rear bar 11 has been assembled in such position with respect to impact bar 10, spacer member 16 is also inserted upwardly from the bottom of cylindrical portion 12 and this spacer member may be of any suitable construction and size, but in the illustration shown, said spacer member consists of a partial cylinder 16 having slots 17 for lightness and extending about one-third the width of the bar 10. In this manner, the integral spacer member, the cylindrical portion 14 and the spacer 16 each occupies about one-third of the width of the bar 10, thus maintaining at all times the cylindrical portion 14 and hence bar 11 centrally disposed with respect to bar 10. A headed bolt 18 is then inserted through all the members and a nut 19 threaded upon the lower end thereof to maintain the members in so assembled position. The head 18' of the bolt 18 is large thereby forming an effective cover for the top of cylindrical portion 12, and in practice a suitable metal washer member 20 is used for stability. If desired, a suitable metal washer 21 and lock washer 22 may be placed as shown in Fig. 2 for the usual purposes.

There is thus formed a connection for the ends of bumper bars wherein the bars are pivotally connected in strong, efficient manner and wherein no special bends are required in the bumper bars themselves, which constitutes a great advance in itself and furthermore no special tools are required in assembling the elements as above indicated.

In some cases I find that I can readily dispense with even the lower spacer member 16 and this is clearly illustrated in the modified form of the invention illustrated in Fig. 4. This form of invention is the same as that of Fig. 2 with the exception that the lower spacer member 16 has been omitted and bolt 18 has been shortened so that it extends just sufficiently below the bar 11 to enable the proper assembly on the lower threaded end of the bolt of washer 21, lock washer 22, and nut 19.

I have shown only one end construction, but it is clearly understood that the other end is identical in all respects with the end shown and no good purpose would be served by showing both ends.

This bumper is intended primarily for the front of automotive vehicles and is especially designed for a bumper having a single impact bar. It must be realized, however, that this bumper could be used in other locations, such as at the rear, or on the corners of vehicles.

I have illustrated and described my invention as applied especially to a bumper of the single impact bar type and especially to a bumper having a relatively wide impact bar and a relatively narrow rear bar, as clearly indicated in the drawing, but it is to be understood that such details are intended to be illustrative only and not limitative as without departing from the spirit and scope of the invention, I contemplate variations in the same which will be clear from the above disclosure.

What I claim as new and desire to secure by Letters Patent is:

1. A protective bumper for automotive vehicles to protect such vehicles from damage against substantially horizontal impacts and to substantially absorb such impacts comprising a front bar, a rear bar and instrumentalities for holding said bars in operatively associated positions, said front bar being the wider of the two bars and having at each end a portion bent around throughout the whole width of the bar until it contacts with the rear surface of the front bar near its end to form a cylindrical open-ended housing, such housing having a vertical cut-away portion extending for a substantial portion of the height of the cylindrical housing at its lower inner edge and forming an integral spacer, said rear bar being narrower and thicker than said front bar, the section modulus of both bars being substantially equal, and having each end bent around into contact with itself to form an open-ended cylindrical housing, the housing on said front bar being of a size to snugly receive therewithin the housing of the rear bar and the rear bar proper adjacent its housing extending through the vertical cut-away portion of the housing of the front bar, the upper edge of such rear bar substantially abutting the lower edge of said integral spacer, and said instrumentalities including a bolt with an enlarged head and the shank of which extends through both said housings together with washers and nuts for maintaining the parts as aforesaid.

2. A protective bumper for automotive vehicles to protect such vehicles from damage against substantially horizontal impacts and to substantially absorb such impacts comprising a front bar, a rear bar and instrumentalities for holding said bars in operatively associated positions, said front bar being the wider of the two bars and having at each end a portion bent around throughout the whole width of the bar until it contacts with the rear surface of the front bar near its end to form a cylindrical open-ended housing, such housing having a vertical cut-away portion extending for a substantial portion of the height of the cylindrical housing at its lower inner edge and forming an integral spacer, said rear bar being narrower than said front bar and having each end bent around into contact with itself to form an open-ended cylindrical housing, the housing on said front bar being of a size to snugly receive in the interior thereof the housing of the rear bar and the rear bar proper adjacent its housing extending through the vertical cut-away portion of the housing of the front bar, the upper edge of such rear bar abutting the lower edge of said integral spacer, and said instrumentalities including a bolt with an enlarged head and the shank of which extends through both said housings together with washers and nuts for maintaining the parts as aforesaid, and a separate yieldable cut-away cylindrical spacer on said bolt shank compensating for the distance from the lower edge of the second housing to the lower edge of the first housing and terminating flush therewith, and a centering washer interposed between said enlarged bolt head and the upper edge of the cylindrical front bar housing.

3. A protective bumper for automotive vehicles to protect such vehicles from damage against substantially horizontal impacts and to substantially absorb such impacts comprising a front bar, a rear bar and instrumentalities for holding said bars in operatively associated positions, said front bar being the wider of the two bars and having at each end a portion bent around throughout the whole width of the bar until it contacts with the rear surface of the front bar near its end to form a cylindrical open-ended housing, such housing having a vertical cut-away portion extending for a substantial portion of the height of the cylindrical housing at its lower inner edge and forming an integral spacer, said rear bar being narrower and thicker than said front bar, the section modulus of both bars being substantially equal, and having each end bent around into contact with itself to form an open-ended cylindrical housing, the housing on said front bar being of a size to snugly receive in the interior thereof the housing of the rear bar and the rear bar proper adjacent its housing extending through the vertical cut-away portion of the housing of the front bar, the upper edge of such rear bar abutting the lower edge of said integral spacer, and said instrumentalities including a bolt with an enlarged head and the shank of which extends through both said housings together with washers and nuts for maintaining the parts as aforesaid, the ends of both bars being bent around in the same direction.

4. A protective bumper for automotive vehicles to protect such vehicles from damage against substantially horizontal impacts and to substantially absorb such impacts comprising a front bar, a rear bar and instrumentalities for holding said bars in operatively associated positions, said front bar being the wider of the two bars and having at each end a portion bent around throughout the whole width of the bar until it contacts with the rear surface of the front bar near its end to form a cylindrical open-ended housing, such housing having a vertical cut-away portion extending for a substantial portion of the height of the cylindrical housing at its lower inner edge and forming an integral spacer, said rear bar being narrower than said front bar and having each end bent around into contact with itself to form an open-ended cylindrical housing, the housing on said front bar being of a size to snugly receive in the interior thereof the housing of the rear bar and the rear bar proper adjacent its housing extending through the vertical cut-away portion of the housing of the front bar, the upper edge of such rear bar substantially abutting the lower edge of said integral spacer, and said instrumentalities including a bolt with an enlarged head and the shank of which extends through both said housings together with washers and nuts for maintaining the parts as aforesaid and a separate yieldable cut-away cylindrical spacer on said bolt shank compensating for the distance from the lower edge of the second housing to the lower edge of the first housing, and terminating flush therewith, and a centering washer interposed between said enlarged bolt head and the upper edge of the cylindrical front bar housing, the ends of both bars being bent around in the same direction.

5. In a bumper end construction wherein there are two cylindrical housings, one within but shorter than the other, and a bolt passing through both housings, a separate yieldable washer insertable on the lower end of such bolt and compensating for the distance between the lower end of the shorter housing and the lower end of the longer housing, such washer comprising a partial cylinder, having a lower closed apertured end and cut-away portions spaced therearound extending nearly the whole height of the washer but terminating short of the closed apertured end thereof.

6. A protective bumper for automotive vehicles comprising a relatively wide and thin front bar, a relatively narrow and thick rear bar and means for pivotally maintaining the ends of such bars in operative association with the rear bar centrally disposed with respect to the front bar, a vertically slotted open-ended cylinder at each end of said front bar, an open-ended cylinder at each end of said rear bar and receivable within the cylinder on the front bar, the rear bar portions adjacent the rear bar cylinders extending outwardly through the vertical slots on the front bar cylinders, and said means including, in addition to a nut and bolt assembly, a yieldable washer on the lower end of the bolt which compensates for the distance between the lower end of the cylinder on the rear bar and the lower end of the cylinder on the front bar and terminates flush with such latter to provide a centered non-binding assembly free to respond to the maximum amount to impacts received by said front bar.

7. A protective bumper for automotive vehicles comprising a relatively wide and thin front bar, a relatively narrow and thick rear bar and means for pivotally maintaining the ends of such bars in operative association with the rear bar centrally disposed with respect to the front bar, a vertically slotted open-ended cylinder at each end of said front bar, an open-ended cylinder at each end of said rear bar and receivable within the cylinder on the front bar, the rear bar portions adjacent the rear bar cylinders extending outwardly through the vertical slots in the front bar cylinders, and said means including, in addition to a nut and bolt assembly, a yieldable washer on the lower end of the bolt which compensates for the distance between the lower end of the cylinder on the rear bar and the lower end of the cylinder on the front bar and terminates flush with such latter to provide a centered non-binding assembly free to respond to the maximum amount to impacts received by said front bar, the front and rear bars being so dimensioned that they have substantially equal section moduli and so that the bumper as a whole has uniform impact resistance throughout.

HARRY R. McMAHON.